United States Patent [19]

Schrott et al.

[11] Patent Number: 4,904,566

[45] Date of Patent: Feb. 27, 1990

[54] OPTICAL RECORDING MEDIUM CONTAINING AN AZULENIUM DYE

[75] Inventors: Wolfgang Schrott, Ludwigshafen; Bernhard Albert, Maxdorf; Peter Neumann, Wiesloch; Heidi Benthack-Thoms, Limburgerhof, all of Fed. Rep. of Germany

[73] Assignee: BASF Aktiengesellschaft, Ludwigshafen, Fed. Rep. of Germany

[21] Appl. No.: 147,909

[22] Filed: Jan. 25, 1988

[30] Foreign Application Priority Data

Feb. 10, 1987 [DE] Fed. Rep. of Germany ....... 3703985

[51] Int. Cl.$^4$ .................. G11B 7/24; G01D 9/00; G03C 5/16; B41M 5/26
[52] U.S. Cl. .................. 430/270; 430/495; 430/945; 346/135.1
[58] Field of Search ............. 430/270, 495, 945; 346/135.1

[56] References Cited

U.S. PATENT DOCUMENTS

| 4,548,886 | 7/1985 | Katagiri et al. |
| 4,565,761 | 1/1986 | Katagiri et al. ............ 430/83 |
| 4,656,121 | 4/1987 | Sato et al. ............ 430/495 |
| 4,737,443 | 4/1988 | Niwa et al. ............ 430/270 |

FOREIGN PATENT DOCUMENTS 0187015 12/1979 European Pat. Off. .
3320674 3/1981 Fed. Rep. of Germany .
252342 12/1985 Japan .

OTHER PUBLICATIONS

Angew. Chem. 78, p. 937 (1966).

*Primary Examiner*—Paul R. Michl
*Assistant Examiner*—Mark R. Buscher
*Attorney, Agent, or Firm*—Oblon, Spivak, McClelland, Maier & Neustadt

[57] ABSTRACT

An optical recording medium composed of a base material and a laser light sensitive layer which contains an azulenium dye as storage material with or without a binder is obtainable by spin-coating a solution containing an azulenium dye of the formula

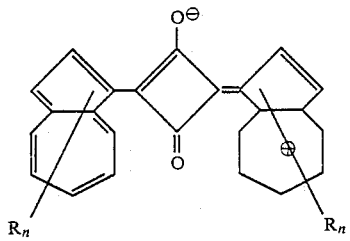

where R is $C_1$–$C_6$-alkyl which may be substituted or unsubstituted, and n is 1, 2 or 3, with or without a binder and one or more solvents which have evaporation numbers of not less than 4 and in which an azulenium dye of the abovementioned formula has a solubility of not less than 5 g/l onto a transparent base material based on a plastics material or glass.

7 Claims, No Drawings

OPTICAL RECORDING MEDIUM CONTAINING AN AZULENIUM DYE

The present invention relates to a novel optical recording medium composed of a base material and a laser light sensitive layer which contains an azulenium dye as storage material with or without a binder, and obtainable by spincoating a solution containing an azulenium dye with or without a binder and one or more solvents which have evaporation numbers of not less than 4 and in which the azulenium dye has a solubility of not less than 5 g/l onto a transparent base material based on a plastics material or glass.

Recording materials which undergo a locally confined change of state on exposure to beams of high energy density, for example laser light, are known. Such a thermally initiated change of state, eg. evaporation, change in flow properties or fading, is accompanied by a change in the optical properties, for example in absorption through change in the absorption maximum or in the molar absorbance, which can be utilized for information or data recording.

Existing information on recording materials consists of a base material to which has been applied thin layers of inorganic material, for example metals, semimetals, alloys or chalcogen glass, or thin layers of organic compounds, for example IR dyes. The thin layers are produced for example by vapor deposition, spincoating or spattering.

To be usable as storage media, the amorphous layers must not undergo any changes in the course of prolonged periods. Aging processes, such as crystallization or fading due to light and heat, which affect the morphology of the storage layer occur relatively frequently with thin, vapor-deposited layers.

DE-A-3,320,674, then, discloses an optical recording medium whose base material consists of glass bearing a vapor-deposited aluminum layer and to which a dispersion of nitrocellulose solution and 1,3-bis(1,4-dimethyl-7-isopropylazulen-3-yl)quadratic acid in methyl ethyl ketone has been applied by spincoating. It has been found, however, that an optical storage material containing such a storage layer has serious disadvantages. For instance, the storage layer is not homogeneous but composed of individual crystals. Inhomogeneous particulate dye layers, however, are not readily focusable with a laser drive, if at all, and consequently not at all or only badly writable. Even the metallization, ie. the vapor deposition of, for example, the thin aluminum layer on the base material, does not produce any improvement, since reflectance is found to fluctuate wildly.

Said DE-A-3,320,674 further describes an optical recording medium prepared by vapor deposition of the corresponding unsubstituted azulenequadratic acid compound and of the 4,8-dimethyl-6-phenylazulene derivative. Apart from the fact that in a high vacuum vapor deposition process major quantities of the dyes to be vaporized are decomposed, these storage means likewise show the abovementioned disadvantages.

It is an object of the present invention to provide a new optical storage medium containing azulenequadratic acid derivatives as storage material which is simple to produce and is efficiently writable and subsequently efficiently readable as well, while the signal-to-noise ratio should be as high as possible.

We have found that this object is achieved with a novel optical recording medium composed of a base material and a laser light sensitive layer which contains an azulenium dye as storage material with or without a binder and obtainable by spincoating a solution containing an azulenium dye of the formula I

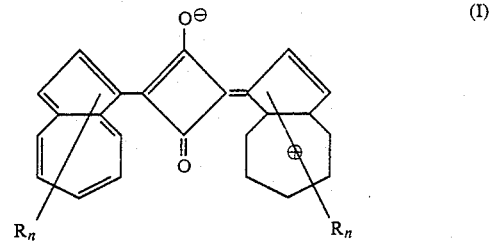

where R is $C_1$–$C_6$-alkyl which may be substituted by halogen, cyano, amino or $C_1$–$C_6$-alkoxy, and n is 1, 2 or 3, with or without a binder and one or more solvents which have evaporation numbers of not less than 4 and in which an azulenium dye of the formula I has a solubility of not less than 5 g/l onto a transparent base material based on a plastics material or glass at from 10° to 50° C., the spincoating solution having a solids content of 0.1 to 15% by weight, based on the solution, and containing from 0 to 50% by weight, based on the solids content of the spincoating solution, of a binder.

Preference is given to an optical recording medium as obtained on spincoating a solution containing from 10 to 20% by weight, based on the solids content of the spincoating solution, of a binder.

Preference is further given to an optical recording medium as obtained on spincoating a solution having a solids content from 1 to 5% by weight, based on the solution.

The optical recording medium according to the invention contains as storage material an azulenium dye of the formula I. R in the formula I is for example, methyl, ethyl, propyl, ispropyl, butyl, isobutyl, sec-butyl, tert-butyl, pentyl, isopentyl, sec-pentyl, tert-pentyl, hexyl, 2-methylpentyl, fluoromethyl, chloromethyl, difluoromethyl, trifluoromethyl, trichloromethyl, 2-fluoroethyl, 2-chloroethyl, 2-bromoethyl, 1,1,1-trifluoroethyl, heptafluoropropyl, 4-chlorobutyl, 5-fluoropentyl, 6-chlorohexyl, cyanomethyl, 2-cyanoethyl, 3-cyanopropyl, 2-cyanobutyl, 4-cyanobutyl, 5-cyanopentyl, 6-cyanohexyl, 2-aminoethyl, 2-aminopropyl, 3-aminopropyl, 2-aminobutyl, 4-aminobutyl, 5-aminopentyl, 6-aminohexyl, 2-methoxyethyl, 2-ethoxyethyl, 2-propoxyethyl, 2-isopropoxyethyl, 2-butoxyethyl, 2-methoxypropyl, 2-ethoxypropyl, 3-methoxypropyl, 3-ethoxypropyl, 4-methoxybutyl, 4-ethoxybutyl, 4-isopropoxybutyl, 5-methoxypentyl, 5-ethoxypentyl or 6-methoxyhexyl.

Preference is given to an optical recording material obtainable by spincoating a solution containing an azulenium dye of the formula I where R is $C_1$–$C_4$-alkyl and n is 3.

Particular preference is given to an optical recording medium as obtained by spincoating a solution containing the azulenium dye of the formula II

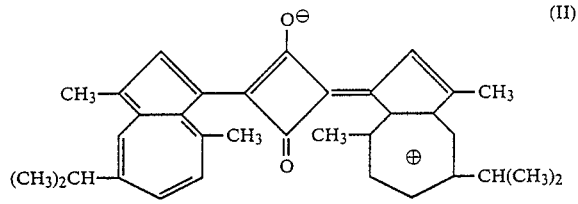

Azulenium dyes of the formula I are partly known and described for example in Angew. Chem. 78 (1966), 937, or in EP-A-187,015, or can be prepared by the methods mentioned therein.

Suitable transparent base materials are glass or plastics materials. Suitable plastics materials are for example poly(meth)acrylates, polycarbonates, polyesters, epoxies, polyolefins (for example polymethylpentene), polyamide, polyvinyl chloride, polystyrene and polyvinyl esters.

A preferred recording medium has a base material of polycarbonate or poly(meth)acrylates, in particular polymethyl methacrylate.

As mentioned above, the spincoating solution can be free of binders. Preferably, however, it does contain a binder, in which case suitable specimens are for example polyorganosiloxanes, epoxides, poly(meth)acrylates, polystyrene homopolymers or copolymers, polyvinylcarbazole, polyvinylpyrrolidone, polyimidazole copolymers, polyvinyl ester copolymers, polyvinyl ether copolymers, polyvinylidene chloride copolymers, acrylonitrile copolymers, polyvinyl chloride or copolymers thereof.

A preferred recording medium has a binder based on a vinylpyrrolidone/vinyl acetate copolymer or a polyvinyl chloride/polyvinyl ether copolymer.

The optical recording medium according to the invention is obtainable by spincoating a solution containing an azulenium dye I with or without a binder and one or more solvents which have evaporation numbers of not less than 4, preferably not less than 6, and in which can azulenium dye of the formula I has a solubility of not less than 5 g/l, preferably not less than 10 g/l onto the base material at from 10° to 50° C., preferably at from 20° to 40° C.

The concept of an evaporation number is known per se and defined in German Standard Specifications DIN 53,170 and DIN 53,249.

Suitable solvents are for example bromoform, 1,1,2-trichloroethane and mixtures thereof. This is true in particular of an optical recording medium which contains the azulenium dye of the formula II.

As stated above, it is possible to use not only individual solvents which meet the requirements mentioned, but also mixtures thereof. In some cases it can even be advantageous to admix up to about 10% by volume of solvents which do not meet the abovementioned requirements. Solvents of this type are for example, toluene, xylene, 2-methoxyethanol, diacetone alcohol and 1,1,1-trichloroethane.

Very particular preference is given to a recording medium which is obtainable by spincoating a solution containing bromoform as solvent and the azulenium dye of the formula II.

If desired, the spincoating solution may also contain up to 5% by weight, based on the solids content of said solution, of additives such as antioxidants, singlet oxygen quenchers or UV absorbers.

Spincoating comprises applying the solution to the rotating base material, which advantageously has a round shape. However, it is also possible to apply the solution to the initially stationary base material and then to set the base material in rotation. The application of the solution to the base material is advantageously effected by means of a syringe or capillary or by means of a mechanical pump.

The base material rotates in general at a speed from 50 to 7000 r.p.m., preferably 500 to 5000 r.p.m., the application of the solution advantageously taking place at a lower speed (for example from 500 to 4000 r.p.m.) and the subsequent spinning to dryness at a higher speed (from about 5000 to 7000 r.p.m.).

The thickness of the laser light sensitive layer ranges from 40 to 160 nm, preferably from 80 to 120 nm. It depends on the speed of rotation, the concentration of the spincoating solution, and the temperature.

In the optical recording medium according to the invention, the laser light sensitive layer is present in the form of a homogeneous, thin, smooth layer which has a high optical quality. For instance, the reflectivity values are generally within the range greater than 12%.

The novel recording medium is further sufficiently sensitive at the wavelength of the laser light source used, so that light pulses having an energy content of a few nJ, when focussed to a diameter of $\leq 1$ $\mu$m, form pits in the surface to give an excellent signal-to-noise ratio.

The solid-state injection lasers which emit in the near infrared, in particular the AlGaAs laser which operates within the wavelength range of about 750 to 950 nm, are particularly highly suitable to use as laser light sources owing to the small size of the device, its low energy consumption and the possibility of directly modulating the optical output power by modulation of the electric drive current.

The Examples which follow will illustrate the invention in more detail.

EXAMPLE 1

1 g of 1,3-bis(1,4-dimethyl-7-isopropylazulen-3-yl)quadratic acid was stirred overnight at room temperature in 20 ml of bromoform and then forced by means of superatmospheric pressure through a frit (P4). The resulting deep-green solution was then applied by means of a syringe to a rotating disk of polymethyl methacrylate (diameter 12 cm). The initial spin speed of 2000 r.p.m. was maintained for 25 sec and then raised to 5000 r.p.m. for 35 sec for drying. The layer obtained was homogeneous, free of pinholes and highly reflective.

EXAMPLE 2

Example 1 was repeated, except that bromoform was replaced by 1,1,2-trichloroethane as solvent. A homogeneous layer of high reflectivity was obtained.

EXAMPLE 3

Example 1 was repeated, except that in place of bromoform a mixture of 10 ml of bromoform and 10 ml of 1,1,2-trichloroethane was used as solvent. A homogeneous layer of high reflectivity was obtained.

EXAMPLE 4

Example 1 was repeated, except that the bromoform was replaced by a mixture of 1,1,2-trichloroethane and toluene as solvent. The particular volume ratios of the solvent mixtures and the properties of the resulting layers are shown in Table 1.

TABLE 1

| Volume ratio 1,1,2-trichloroethane:toluene | Properties of the layer |
| --- | --- |
| 95:5 | homogeneous, of high reflectivity |
| 85:15 | homogeneous, of low reflectivity |
| 70:30 | homogeneous, thin layer, of low reflectivity |
| 50:50 | homogeneous, very thin layer, of low reflectivity |

EXAMPLE 5 (comparison)

To 0.3 g of the dye described in Example 1, were added 6 ml of each of the solvents mentioned in Table II, and the mixture was stirred overnight at room temperature and then forced by means of superatmospheric pressure through a frit (P4). The resulting solutions were each spincoated by means of a syringe as described in Example 1.

The solvents used and the properties of the resulting layers are shown in Table 2.

TABLE 2

| Solvent | Properties of layer |
| --- | --- |
| toluene | homogeneous, absorption and reflectivity low |
| xylene | homogeneous, absorption and reflectivity low |
| chlorobenzene | homogeneous, hardly any absorption |
| methylene chloride | extremely inhomogeneous, stripes, microcracks |
| chloroform | inhomogeneous, many pinholes |
| 1,1,1-trichloroethane | homogeneous, reflectivity very low |
| 1,2-dichloroethene | homogeneous, absorption and reflectivity low |
| butan-2-one | homogeneous, absorption and reflectivity very low |

EXAMPLE 6

0.2 g of the dye described in Example 1 and 0.1 g of a copolymer of vinylchloride and vinyl isobutyl ether (3:1) were dissolved in 14 g of 1,1,2-trichloroethane. Example 1 was then repeated from this point on to give a homogeneous, pinhole-free layer of high reflectivity.

EXAMPLE 7

Example 6 was repeated, except that a binder based on a polyvinyl acetate/polyvinylpyrrolidone copolymer (60:40) was used. A homogeneous, pinhole-free layer of high reflectivity was obtained.

We claim:

1. An optical recording medium composed of a base material and a laser light sensitive layer which contains an azulenium dye as storage material with or without a binder and obtainable by spincoating a solution containing an azulenium dye of the formula:

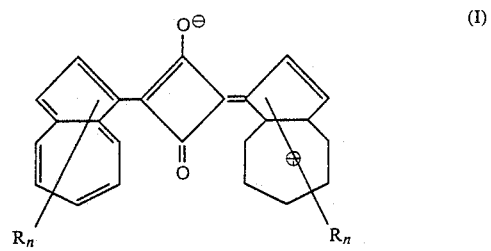

where R is $C_1$–$C_6$-alkyl, and n is 1, 2 or 3, with or without a binder selected from the group consisting of polyorgano-siloxanes, epoxides, poly(meth)acrylates, polystyrene homopolymers or copolymers, polyvinylcarbazole, polyvinylpyrrolidone, polyimidazole copolymers, polyvinyl ester copolymers, polyvinyl ether copolymers, polyvinylidene chloride copolymers, acrylonitrile copolymers, polyvinyl chloride or copolymers thereof, and a solvent selected from the group consisting of bromoform and 1,1,2-trichloroethane, onto a transparent base material based on a plastic material or glass at from 10° to 50° C. the spincoating solution having a content of dissolved solids of 0.1 to 15% by weight, based on the solution, and containing from 0 to 50% by weight, based on the content of dissolved solids of the spincoating solution, of a binder.

2. The optical recording medium as claimed in claim 1, obtainable by spincoating a solution containing from 10 to 20% by weight, based on the content of dissolved solids of the spincoating solution, of a binder.

3. The optical recording medium as claimed in claim 1, obtainable by spincoating a solution having a content of dissolved solids from 1 to 5% by weight, based on the solution.

4. The optical recording medium as claimed in claim 1, obtainable by spincoating a solution containing an azulenium dye of the formula I where R is $C_1$–$C_6$-alkyl and n is 3.

5. The optical recording medium as claimed in claim 1, wherein said transparent plastic material is a poly(meth)acrylate, a polycarbonate, a polyester, an epoxy, a polyolefin, a polyamide, a polyvinyl chloride, a polystyrene or a polyvinyl ester.

6. The optical recording medium as claimed in claim 1, wherein said azulenium dye has a solubility of not less than 10 g/l.

7. The optical recording medium as claimed in claim 1, wherein said solution is spincoated onto said base material at a temperature ranging from 20°–40° C.

* * * * *